(12) United States Patent
Winkel

(10) Patent No.: US 11,940,053 B2
(45) Date of Patent: **\*Mar. 26, 2024**

(54) SHUTOFF SEAL ASSEMBLIES AND RELATED VALVE ASSEMBLIES AND METHODS

(71) Applicant: Flowserve Management Company, Irving, TX (US)

(72) Inventor: Laren J. Winkel, Highland, UT (US)

(73) Assignee: Flowserve Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,020

(22) Filed: Aug. 25, 2022

(65) Prior Publication Data

US 2022/0403939 A1  Dec. 22, 2022

Related U.S. Application Data

(63) Continuation of application No. 16/321,423, filed as application No. PCT/US2017/044231 on Jul. 27, 2017, now Pat. No. 11,428,328.

(Continued)

(51) Int. Cl.
*F16K 1/42* (2006.01)
*F16J 15/44* (2006.01)
(Continued)

(52) U.S. Cl.
CPC ............. *F16K 1/42* (2013.01); *F16J 15/441* (2013.01); *F16K 1/465* (2013.01); *F16K 1/36* (2013.01); *F16K 25/005* (2013.01); *F16K 39/022* (2013.01)

(58) Field of Classification Search
CPC ... F16K 1/44; F16K 1/36; F16K 1/465; F16K 1/42; F16K 39/022; F16K 25/005;
(Continued)

(56) References Cited

U.S. PATENT DOCUMENTS 4,071,220 A * 1/1978 Iino ................ F16K 5/0678
251/315.05
4,477,057 A * 10/1984 Friess ............... F16K 1/2266
251/306
(Continued)

FOREIGN PATENT DOCUMENTS

| | | |
|---|---|---|
| CN | 105443786 A | 3/2016 |
| IN | 203442151 U | 2/2014 |
| WO | 2014003461 A1 | 1/2014 |

OTHER PUBLICATIONS

Search Report and Written Opinion from International Application No. PCT/US2017/044231, dated Oct. 25, 2017, 18 pages.

*Primary Examiner* — Craig J Price
*Assistant Examiner* — Andrew J Rost
(74) *Attorney, Agent, or Firm* — BKRIP LLC

(57) ABSTRACT

A valve assembly includes a valve body having a seat-retainer chamber with a floating seat ring disposed adjacent an inner sidewall of the seat-retainer chamber. The floating seat ring is configured to contact a first portion of a plug head at a single annular location prior to a second portion of the plug head contacting a valve primary seat during a closing stroke of the plug head. A static seal is located radially between the floating seat ring and the inner sidewall of the seat-retainer chamber.

20 Claims, 2 Drawing Sheets

Related U.S. Application Data

(60) Provisional application No. 62/368,033, filed on Jul. 28, 2016.

(51) Int. Cl.
*F16K 1/46* (2006.01)
*F16K 1/36* (2006.01)
*F16K 25/00* (2006.01)
*F16K 39/02* (2006.01)

(58) Field of Classification Search
CPC ......... F16J 15/442; F16J 15/441; F16J 15/18; F16J 15/3212; F16J 15/3452
See application file for complete search history.

(56) References Cited

U.S. PATENT DOCUMENTS

| | | | | |
|---|---|---|---|---|
| 4,505,292 A | * | 3/1985 | Osterode | F16K 1/446 137/240 |
| 4,658,847 A | * | 4/1987 | McCrone | E06B 5/164 251/315.1 |
| 5,722,637 A | * | 3/1998 | Faramarzi | F16K 25/005 251/190 |
| 6,056,291 A | * | 5/2000 | Inagaki | F16J 15/0893 277/618 |
| 6,772,993 B1 | * | 8/2004 | Miller | F16K 47/08 251/363 |
| 7,111,821 B2 | * | 9/2006 | Promper | F16K 5/0694 277/553 |
| 7,640,841 B2 | * | 1/2010 | An | F16J 15/3232 277/553 |
| 7,736,122 B1 | * | 6/2010 | Stone | F16J 15/0887 415/200 |
| 7,963,503 B2 | * | 6/2011 | Day | F16K 1/2266 251/305 |
| 8,011,386 B2 | | 9/2011 | Gossett et al. | |
| 2002/0017327 A1 | | 2/2002 | Kawaai et al. | |
| 2006/0207666 A1 | | 9/2006 | Micheel et al. | |
| 2007/0164517 A1 | | 7/2007 | Caprera | |
| 2009/0179163 A1 | | 7/2009 | Fleming | |
| 2012/0025121 A1 | | 2/2012 | Winkel et al. | |

* cited by examiner

SHUTOFF SEAL ASSEMBLIES AND RELATED VALVE ASSEMBLIES AND METHODS

CROSS-REFERENCE TO RELATED APPLICATIONS

This application is a continuation of U.S. patent application Ser. No. 16/321,423, titled "SHUTOFF SEAL FOR HIGH TEMPERATURE PRESSURE BALANCE VALVE AND RELATED METHODS," filed Jan. 28, 2019, which application is a national phase entry under 35 U.S.C. § 371 of International Patent Application PCT/US2017/044231, filed Jul. 27, 2017, designating the United States of America and published in English as International Patent Publication WO 2018/022924 A1 on Feb. 1, 2018, which claims the benefit of the filing date of U.S. Provisional Patent application Ser. No. 62/368,033, filed Jul. 28, 2016, the disclosure of each of which is hereby incorporated herein in its entirety by this reference.

TECHNICAL FIELD

The present invention relates generally to pressure-balanced control valves in high temperature services. More particularly, embodiments of the present invention relate to pressure-balanced control valves comprising a shut-off sealing system when the valve is in the closed position.

BACKGROUND

Pressure-balanced (PB) control valves require a dynamic seal between the PB plug head and the sleeve in which the plug slides up and down. In a PB control valve, the pressure contained on the top of the plug head is nearly equal to the pressure on the bottom of the plug head, achieved conventionally via holes that pass through the plug head. This "balance" effect on the plug head allows the plug head to be stroked through high valve pressure drops with minimal actuator load. This balancing effect reduces the overall cost of the valve since smaller actuators can be used to control the flow through the valve.

A dynamic seal is conventionally used to seal between the plug and the sleeve to maintain the pressure in the chamber on the top of the plug head. The dynamic seal is usually located on the outer diameter of the plug head, and may be a carbon or metal piston ring seal for high temperature applications. Some high temperature applications require leakage levels to be very low and capable of meeting ANSI/FCI 70-2 Class V leakage rates when the valve is shut. High temperature dynamic seals are usually only capable of providing ANSI/FCI 70-2 Class III or Class IV shutoff. In high temperature applications (+500° F.), fluid from the chamber over the plug head will bypass the dynamic seal to an extent where the valve is incapable of achieving ANSI/FCI 70-2 Class V shutoff without the implementation of a pilot operated plug design. Pilot operated plug designs include more components, introduce stability limitations, and are also more expensive.

DISCLOSURE

This summary is provided to introduce a selection of concepts in a simplified form. These concepts are described in further detail in the detailed description of embodiments of the disclosure below. This summary is not intended to identify key features or essential features of the claimed subject matter, nor is it intended to be used to limit the scope of the claimed subject matter.

In some embodiments, a valve assembly includes a valve body having a seat-retainer chamber and a seat ring disposed adjacent an inner sidewall of the seat-retainer chamber. The primary seat ring is configured to contact a first portion of a plug head at a single annular location prior to a second portion of the plug head contacting a floating valve seat during a closing stroke of the plug head. The valve assembly includes a static seal located radially between the seat ring and the inner sidewall of the seat-retainer chamber.

In additional embodiments, a method of forming a valve assembly includes forming a valve body comprising an inlet, an outlet and a seat-retainer chamber. The method includes positioning a floating seat ring adjacent an inner sidewall of the seat-retainer chamber, positioning a static seal radially between the seat ring and the inner sidewall of the seat-retainer chamber, and positioning a plug in the seat-retainer chamber. The plug includes a plug head with a first portion and a second portion. The first portion of the plug head is configured to contact the primary seat ring at a single annular location prior to the second portion of the plug head contacting a floating valve seat during a closing stroke of the plug.

DETAILED DESCRIPTION

The illustrations presented herein are, in some instances, not actual views of any particular valve, plug, seat or seal, but are merely idealized representations which are employed to describe the embodiments of the present disclosure. Additionally, elements common between figures may retain the same numerical designation.

Figure 1:
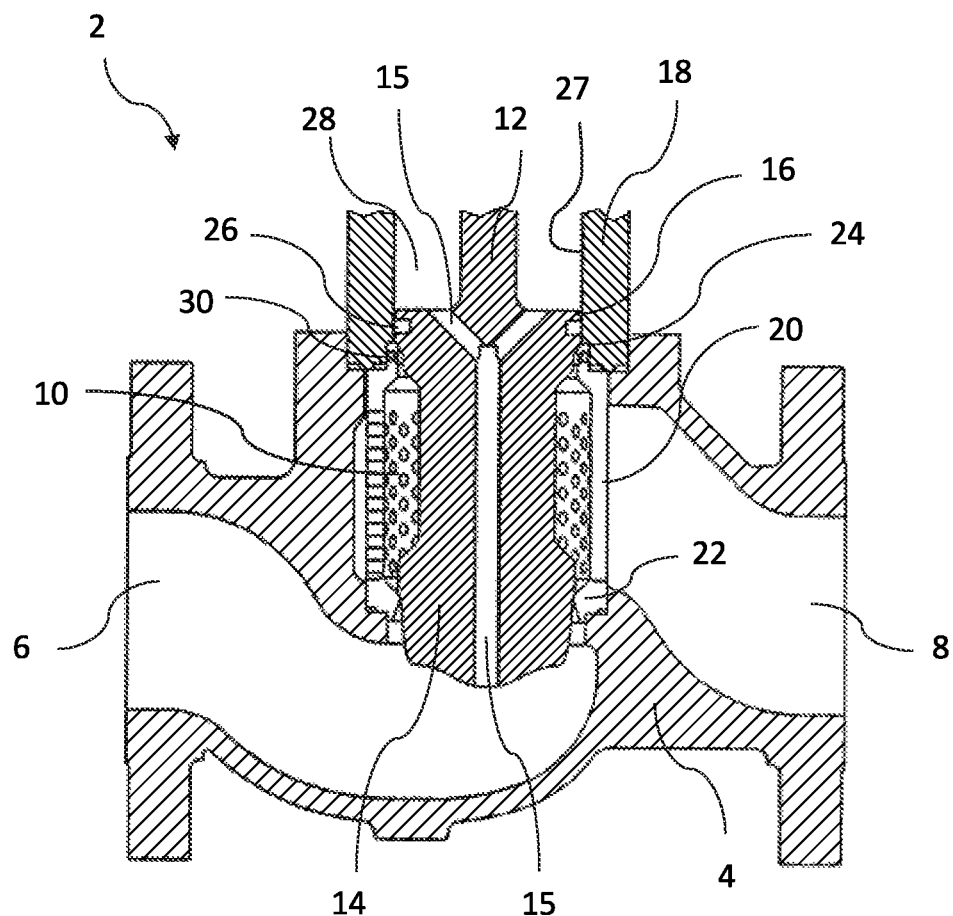
FIG. 1 illustrates a cross-section elevation view of a valve body sub-assembly according to an embodiment of the present disclosure.

Various embodiments of the present disclosure are directed toward embodiments of a pressure-balanced control valve comprising a shut-off sealing system including at least one static seal and at least one dynamic seal. Referring to FIG. 1, a cross-section elevation view is shown of a valve assembly 2 according to at least one embodiment. The valve body sub-assembly 2 may comprise a valve body 4 having an inlet 6, an outlet 8, and a seat-retainer chamber 10. It is understood that the inlet 6 could also act as an outlet and that the outlet 6 could also act as an inlet, as the pressure-balanced control valve of the present disclosure is a bi-direction capable shut-off seal. A plug 12 may be positioned in and configured to move within a seat retainer chamber 10. In FIG. 1, the plug 12 is shown in a closed position (i.e., no fluid passing through the valve). The plug 12 may comprise a plug head 14 filling a portion of the seat retainer chamber 10. The valve body sub-assembly 2 may comprise a pressure-balanced valve. Accordingly, the plug head 14 may include a plurality of pressure balance holes 15 extending therethrough and allowing fluid to balance the pressure above the plug head 14, thereby reducing the amount of force to be applied by an actuator to open and close the valve.

In at least some embodiments, the plug head 14 may comprise an annular flange 16 configured to be adjacent to an inner sidewall of the seat-retainer chamber 10. In the embodiment shown in FIG. 1, the seat-retainer chamber 10 may be defined by a pressure-balanced (PB) sleeve 18, a seat retainer 20, a primary seat ring 22, and a floating seat ring 24. The PB sleeve 18 and the seat retainer 20 may form at least part of an inner sidewall of the seat-retainer chamber 10. The floating seat ring 24 may be retained between the PB sleeve 18 and the seat retainer 20, as discussed in more detail below. The floating seat ring 24 may be located in the seat-retainer chamber 10 so that the plug head 14 contacts the floating seat ring 24 at least substantially only when the plug 12 is in the closed positioned (i.e., when the plug 12 is adjacent or on the primary seat ring 22). The plug head 14 may comprise a dynamic seal 26, which may also be referred to as a PB seal or a PB seal ring. The dynamic seal 26 may be positioned on the outer diameter of the plug head 14 so as to be adjacent to an inner wall 27 of the PB sleeve 18. The dynamic seal 26 aids in sealing a plug or sleeve chamber 28 of the seat-retainer chamber 10 located above the plug head 14 from fluid passage between the plug head 14 and the PB sleeve 18. In at least some embodiments, the dynamic seal 26 may be positioned in a groove located in a portion of the annular flange 16. The dynamic seal 26 may be a carbon or metal piston ring seal, by way of non-limiting example. The dynamic seal is only needed to maintain a balancing pressure while the plug is moving and not on the primary seat ring.

Figure 2:
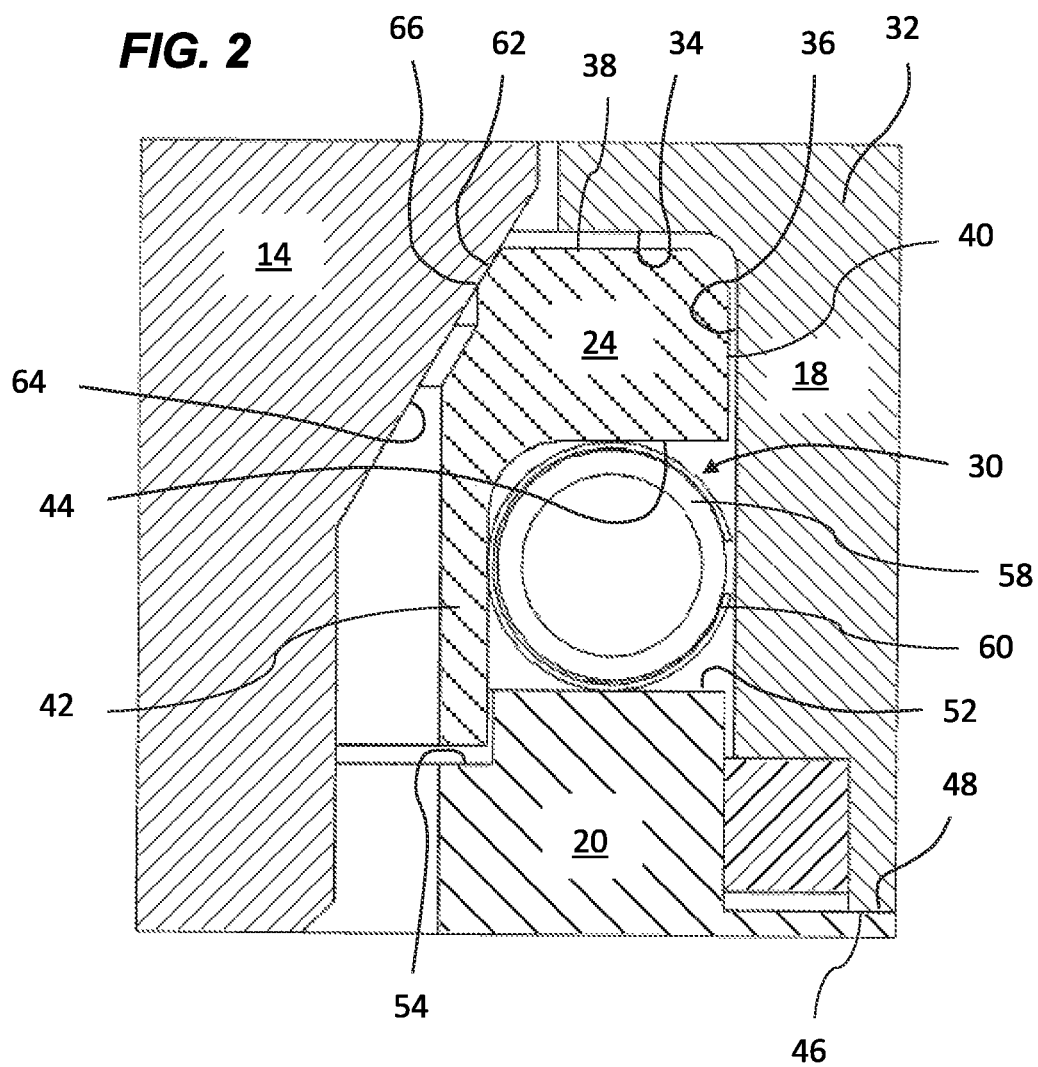
FIG. 2 illustrates a magnified cross-section elevation view of the shutoff seal assembly of the valve body sub-assembly of FIG. 1.

A static seal 30, also referred to as a PB shutoff seal, may be positioned in a portion of the inner sidewall of the seat-retainer chamber 10 between the floating seat ring 24, the PB sleeve 18 and the seat retainer 20. Referring now to FIG. 2, the floating seat ring 24 may be retained between the PB sleeve 18 and the seat retainer 20. A bottom portion 32 of the PB sleeve 18 may include a shoulder 34 contiguous with an annular recessed surface 36 formed in the PB sleeve 18. The shoulder 34 of the lower portion 32 of the PB sleeve 18 may be located adjacent a top surface 38 of the floating seat ring 34. The annular recessed surface 36 of the bottom portion 32 of the PB sleeve 18 may be located adjacent a radially outer surface 40 of the floating seat ring 34. The floating seat ring 24 may include an annular longitudinal extension 42 extending downward from a bottom surface 44 of the floating seat ring 24. In this manner, a cross-section of the floating seat ring 24 may have an inverted L-shape when viewed in a plane extending along a longitudinal axis of the floating seat ring 24. A bottom surface 46 of the PB sleeve 18 may abut against an upper surface 48 of the seat retainer 20. An upper portion of the seat retainer 20 may include an upwardly depending flange forming a raised platform surface 52. An annular depression at a radially inward portion of the raised platform surface 52 may form an annular landing 54 configured to receive a portion of the annular longitudinal extension 42 of the floating seat ring 24. The static seal 30 may be located in an annular cavity positioned radially between the longitudinal extension 42 of the floating seat ring 24 and the annular recessed surface 36 of the PB sleeve 18 and positioned longitudinally between the shoulder 38 of the PB sleeve 18 and the raised platform surface 52 of the seat retainer 20.

The static seal 30 may include an annular seal spring 58 disposed within a C-shaped, annular seal jacket 60. The annular seal spring 58 may independently energize the static seal 30. The annular seal spring 58 may be a coil spring, by way of non-limiting example, such as a single-coil or double-coil helical spring. The annular seal spring 58 may include one or more high strength materials including, by way of non-limiting example, nickel, elgiloy, Inconel™ and Incoloy. The C-shaped, annular seal jacket 60 may include one or more materials including, by way of non-limiting example, silver, nickel, Inconel and Monel.

An upper and radially inward portion of the floating seat ring 24 may include a beveled surface 62 proximate the top surface 38 of the floating seat ring 24. The plug head 14 may include a radially outward beveled surface 64 sized and oriented to contact the floating seat ring 24 during a closing stroke of the plug 12. In the cross-sectional views of FIGS. 2 and 3, the floating seat ring 24 and the plug head 14 may be cooperatively configured such that, during the closing stroke of the plug 12, the outer beveled surface 64 of the plug head 14 contacts the floating seat ring 24 at a single contact point 66 located at the lower edge of the beveled surface 62 of the floating seat ring 24. It is to be appreciated that, in three-dimensional space, the single contact point 66 extends annularly about the circumference of the lower edge of the beveled surface 62 of the floating seat ring 24. In FIG. 2, the plug head 14 is shown in a closing (i.e., downward) stroke at an axial position in which the outer surface 64 of the plug head 14 first makes contact with the floating seat ring 24 at the single contact point 66 thereof. Accordingly, FIG. 2 depicts the annular seal spring 58 and the C-shaped, annular seal jacket 60 of the static seal 30 in an uncompressed state. During the closing stroke of the plug head 14, the outer surface 64 of the plug head 14 may initially contact the single contact point 66 of the floating seat ring 24 when the plug head 14 is separated from the primary seat ring 22 by a distance of about 0.010 inch, by way of non-limiting example. In a particular embodiment, when the plug first contacts the floating seat ring, it will compress between 0.005 and 0.010 inch before it contacts the primary seat ring. It may continue to compress the floating seat ring depending on the deflections that occur in the primary seat ring. This is usually only an additional few thousands of an inch. As the plug head 14 further strokes into the primary seat ring 22, the static seal 30 may be compressed, as described in more detail below.

Figure 3:
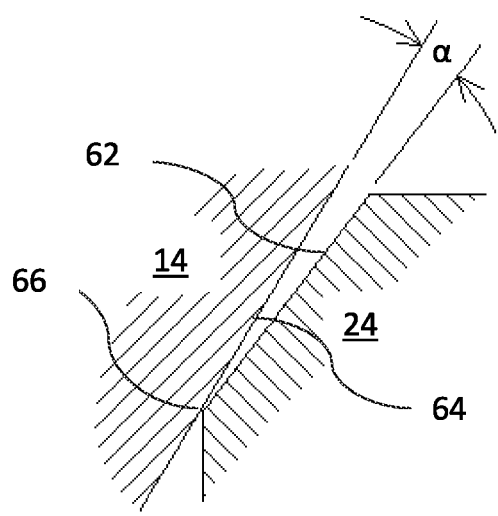
FIG. 3 illustrates a further magnified cross-section elevation view of a contact point between a plug head and the floating seat ring shown in FIG. 2.

As shown more clearly in FIG. 3, the beveled surface 62 of the floating seat ring 24 and the outer surface 64 of the plug head 14 may be oriented relative to one another at an angle α in the range from about 1.5 degrees to about 20 degrees. In a particular embodiment, the differential angle α may be about 3 degrees, plus or minus 1 degree. For example, in some embodiments, the angle α between the beveled surface 62 of the floating seat ring 24 and the outer surface 64 of the plug head 14 may be about 3 degrees. In such embodiments, the closing stroke of the plug head 14 (i.e., in the downward direction when the valve assembly is positioned as shown in FIGS. 1 and 2) may cause the floating seat ring 24 to move downward in a substantially purely axial direction with substantially no radial movement to compress the static seal 30. In this manner, the floating seat ring 24 may be sealed by means of a static line load contact point, which forms a more robust seal than those that utilize sliding surfaces. For example, particulates from "dirty" fluids or metal oxides present in the fluid due to corrosion may interfere significantly less in the valve assembly 2 disclosed herein as a result of the plug head 14 and the floating seat ring 24 having no surfaces sliding against one another. Additionally, the lack of sliding surfaces also prevents friction between the plug head 14 and the floating seat ring 24, avoiding instability from sudden releases of friction, also termed "stick slip," when the plug head 14 retracts from the floating seat ring 24 during an opening stroke.

The downward axial movement of the floating seat ring 24, responsive to the closing stroke of the plug head 14, may compress the annular seal spring 58 and the C-shaped, annular seal jacket 60 of the static seal 30 to form fluid-tight seals between the seal jacket 60 and the bottom surface 44 of the floating seat ring 24 and the raised platform surface 50 of the seat retainer 20. Accordingly, the orientation of the open portion of the C-shaped, annular seal jacket shown in FIG. 2 provides sealing in both directions between the portion 28 of the seat-retainer chamber 10 above the plug head 14 and the valve outlet 8. The same is true when the flow is alternated in the opposite direction. An actuator driving the plug 12 may be sized to have sufficient force to compress the static seal 30 after the outer surface 64 of the plug head 14 contacts the beveled surface 62 of the floating seat ring 24. In embodiments where the annular seal spring 58 is a coil spring, the coil spring 58 may fully recover even after repeated compressions without relaxing or deforming, unlike wedging seals used in the art.

It is to be appreciated that the static seal 30 may be constrained by adjacent parts of the floating seat ring 24, the PB sleeve 18, and the seat retainer 20 to prevent the static seal 30 from "blowout" when the plug head 14 pulls away under high pressure loads. Additionally, the location of the static seal 30 in the cavity between adjacent parts of the floating seat ring 24, the PB sleeve 18 and the seat retainer 20 protects the static seal 30 from damaging effects of the fluid flowing through the valve.

Additional embodiments of the invention comprise methods of making a valve assembly. Such methods may comprise forming a valve body comprising an inlet, an outlet, and a seat-retainer chamber. A dynamic seal may be positioned in an annular groove located in the outer diameter of an annular flange of a plug head. A static seal may be positioned between a longitudinal extension of a floating seat ring, a bottom surface of the floating seat ring, an inner surface of a pressure balance sleeve, and an upper surface of a seat retainer. An outer surface of the plug head may be oriented relative to an inner surface of the floating seat ring such that the plug head contacts the floating seat ring at a single contact point during the closing stroke of the plug head.

A valve assembly 2 for a PB control valve formed as disclosed herein has the advantage of providing tight shutoff in high temperature applications exceeding 500° F. that also require ANSI/FCI 70-2 Class V shutoff without a pilot operated element, as pilot operated valves have additional components that often result in stability limitations and are generally more expensive than non-pilot operated valves. Moreover, Class V shutoff may be provided by the configuration of the plug head 14, the floating seat ring 24, the PB sleeve 20 and the seat retainer 20 disclosed herein, even if the dynamic seal 26 is only capable of providing only Class III or Class IV shutoff when the plug head 14 is engaged with the primary seat ring 22. In this manner, any leakage from the portion 28 of the seat-retainer chamber above the plug head 14 that bypasses the dynamic seal 26 may be sealed from the valve outlet 8 by the static seal 30 when the plug is contacting the primary seat ring 22.

While certain embodiments have been described and shown in the accompanying drawings, such embodiments are merely illustrative and not restrictive of the scope of the invention, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and equivalents, of the claims which follow.

What is claimed is:

1. A valve assembly, comprising:
   a valve body including a seat-retainer chamber;
   a floating seat ring disposed in the seat-retainer chamber, the floating seat ring configured to contact a first portion of a plug head at a single annular location prior to a second portion of the plug head contacting a valve seat during a closing stroke of the plug head, the floating seat ring being axially spaced from the valve seat and configured to move axially toward the valve seat after being contacted by the plug head at an end of the closing stroke;
   a sleeve at least partially defining an inner sidewall in the seat-retainer chamber;
   a static seal located radially between the floating seat ring and the inner sidewall defined by the sleeve; and
   a seat retainer retaining the floating seat ring in the seat-retainer chamber, wherein the static seal is located axially between the floating seat ring and the seat retainer.

2. The valve assembly of claim 1, wherein the floating seat ring comprises an annular extension extending axially along the static seal.

3. The valve assembly of claim 2, wherein the annular extension of the floating seat ring partially encloses the static seal in a cavity defined between the sleeve, the seat retainer, and the floating seat ring.

4. The valve assembly of claim 3, wherein the floating seat ring is bordered by at least a portion of the sleeve and at least a portion of the seat retainer.

5. The valve assembly of claim 2, wherein the annular extension of the floating seat ring overlaps with at least a portion of the seat retainer along a radial direction.

6. The valve assembly of claim 1, wherein the static seal is disposed in a cavity located radially between an axially extending portion of the floating seat ring and the sleeve and located longitudinally between the floating seat ring and the seat retainer.

7. The valve assembly of claim 1, wherein the static seal comprises a coil spring.

8. A sealing assembly for use with a valve assembly, comprising:
   a floating seat ring comprising an annular extension and configured to be disposed and move within a seat-retainer chamber of the valve assembly, the floating seat ring configured to contact a first portion of a plug head of the valve assembly at a single annular location prior to a second portion of the plug head contacting a valve seat during a closing stroke of the plug head;
   a seat retainer configured to retain the floating seat ring in the seat-retainer chamber; and
   a static seal located radially adjacent to the annular extension of the floating seat ring and axially between a body portion of the floating seat ring and the seat retainer, the static seal configured to bias the floating seat ring in an initial position spaced from the seat retainer.

9. The sealing assembly of claim 8, further comprising a sleeve configured to at least partially radially encompass the floating seat ring and define an inner sidewall in the seat-retainer chamber.

10. The sealing assembly of claim 9, wherein the static seal is contained within a chamber defined by the floating seat ring, the seat retainer, and the sleeve.

11. The sealing assembly of claim 10, wherein the annular extension of the floating seat ring overlaps with at least a portion of the seat retainer along a radial direction of the sealing assembly.

12. The sealing assembly of claim 11, wherein the seat retainer comprises an annular notch configured to receive a portion of the annular extension of the floating seat ring.

13. The sealing assembly of claim 10, wherein a majority of the static seal is contained within a chamber defined between the floating seat ring and the seat retainer.

14. The sealing assembly of claim 10, wherein the floating seat ring is configured to move in substantially only in an axial direction after being contacted by the plug head during the closing stroke of the plug head.

15. A method of forming a seal in a valve assembly, comprising:
  disposing a movable floating seat ring within a seat-retainer chamber of the valve assembly;
  biasing the floating seat ring in an initial position with a static seal;
  defining a seal with a first portion of a plug head of the valve assembly with the floating seat ring at a single annular location prior to a second portion of the plug head contacting a valve seat during a closing stroke of the plug head;
  retaining the floating seat ring in the seat-retainer chamber with a seat retainer; and
  compressing Hail the static seal with the floating seat ring during the closing stroke of the plug head, the static seal located axially between the floating seat ring and the seat retainer.

16. The method of claim 15, further comprising radially enclosing at least a portion of the static seal with an annular extension of the floating seat ring.

17. The method of claim 16, further comprising radially overlapping a portion of the annular extension of the floating seat ring along the seat retainer.

18. The method of claim 15, further comprising moving the floating seat ring in an axial direction while at least a portion of the static seal remains fixed in the axial direction.

19. The method of claim 15, further comprising radially encompassing the static seal and the floating seat ring with a sleeve.

20. The method of claim 19, further comprising enclosing the static seal with the floating seat ring, the seat retainer, and the sleeve.

* * * * *